Patented Aug. 28, 1934

1,971,746

UNITED STATES PATENT OFFICE 1,971,746

PREPARATION OF RUBBER

Marcellus T. Flaxman, Los Angeles, Calif., assignor to Union Oil Company of California, Los Angeles, Calif., a corporation of California No Drawing. Application January 22, 1932, Serial No. 588,229

3 Claims. (Cl. 18—52)

The present invention relates to the preparation of rubber and principally to the reclamation of vulcanized rubber and the reclaimed product, to the plasticizing of raw rubbers and of rubber mixtures, and to the treatment in general of rubbers and rubber mixtures.

Generally stated the reclamation of used rubber consists in the devulcanization of the rubber. By devulcanization is usually meant the softening of the mass with only a partial loss of coherence so that the mass can be reduced by mechanical working to a form in which it can be readily washed, dried and sheeted or moulded to permit its re-use either alone or in combination with other materials such as raw rubber. Plasticizing refers to the incorporation into raw rubber, or rubber mixtures, of an agent which in conjunction with mechanical working will render the mass plastic so that it may be sheeted, moulded or otherwise handled prior to vulcanization.

The main object of the invention is to develop convenient, economical and efficient procedures for reclaiming vulcanized or scrap rubber which will produce a reclaimed rubber of high quality and desirable characteristics closely approximating those of the original rubber or rubber mixture used in the original goods before their vulcanization. It is also an object to prepare highly desirable plasticized rubbers and other rubber bodies which may be subsequently vulcanized.

It has been the common practice in the reclamation of rubber to shred or grind the entire body from which rubber is to be recovered, to treat the mass for the separation of fiber contained therein and then to recover the rubber with various treating agents. Usually the recovered rubber has been of poor quality. One reclaiming process which has been very desirable comprises the devulcanization of the rubber with a softener and solvent known as Edeleanu extract. This extract, contains complex nitrogen and sulfur bodies, aromatic and unsaturated hydrocarbons, and is a by-product obtained in the refining of petroleum distillates by extraction with liquid sulfur dioxide according to the well known Edeleanu process. In reclaiming rubber the Edeleanu extract may be used as a solvent to dissolve the vulcanized rubber from the fiber, or the extract may be used to soften the rubber and some other agent employed to dissolve fiber when present.

I have discovered that instead of using Edeleanu extract vulcanized rubber may be reclaimed with similar results by the use of various petroleum residues and distillates which can be obtained from the cracking of petroleum in connection with the production of cracked gasoline from various petroleum stocks such as crude petroleum and gas oil. Many of the cracked products are usable, some being more valuable than others.

It is preferable that the stock or distillates from which such residues and bottoms are obtained be not acid treated unless very lightly acid treated, and also that those distillates which are themselves to be employed be not acid treated unless very lightly. Acid treatment tends apparently to remove those fractions which are most effective in softening and reclaiming the rubber. However bottoms and distillates from acid treated fractions are usable in those instances where the acid treatment has not been sufficient to remove the greater percentage of the required constituents. Thus, a treatment with 10 pounds of 93% $H_2SO_4$ per barrel of oil followed by neutralization will be sufficiently light as not to remove an undue proportion of desired constituents.

The chemical composition of the necessary constituents found in the agents described is not known to me, but in all cases they are complex organic compounds containing various hydrocarbons which undoubtedly are in the form of aromatic and unsaturated compounds and include nitrogen and sulfur compounds together with gummy or resinous fractions. It is probable that the utility of these cracked agents is due to their relatively high aromatic character, or at least is due to a considerable extent to this characteristic. It is pointed out that cracking increases the percentage of the aromatic as well as the unsaturates and the gummy and resinous constituents, to a point well above the percentage present in the original oil, and possibly increases the nitrogen and sulfur content of certain of the heavier fractions and residues.

As an example of the various cracked agents which may be employed, cracked bottoms remaining as residues after the cracked distillates have passed over as overhead or volatile fractions, are particularly valuable; and where desirable these residues themselves may be subsequently distilled leaving only a coke or the like, the distillates from the residues or fractions of such distillates being the cracked residual fractions desired. Again certain of the distillates from the cracking operation may be redistilled and the bottoms from such redistillation may be employed. Thus the lighter cracked overhead fraction known as "pressure distillate" may be redistilled with steam, either before or after acid treatment, to produce cracked gasoline, and these "steam still bottoms" may be employed as a reclaiming agent.

As further examples of suitable agents, I may use certain of the distillates themselves as they are obtained from the cracking operation, such as the fraction known as gas oil cycle stock, or even a lighter fraction in the gasoline range. Such fractions are especially suitable when they are obtained from an original stock which is in itself high in the aromatic and other constituents specified; such a stock is the highly naphthenic crude produced in the San Joaquin Valley oil fields in California.

The various cracked residues, distillates and steam still bottoms above described constitute the reclaiming and devulcanizing agents referred to herein. I have found also that these agents not only are good softeners and reclaiming agents for vulcanized rubber, but they are also very desirable for softening and plasticizing both vulcanized rubber and coagulated raw rubber for which purposes they may be successfully employed in only relatively small quantities. In the latter cases where used at suitable temperatures and in suitable proportions as hereinafter described they render vulcanized scrap rubber highly plastic and cause it to attain characteristics and properties closely approximating those of the original unvulcanized rubber or rubber mixture used in the original goods. And similarly these agents may be used in small quantities for plasticizing raw sheet rubber on a rubber mill or in other mechanical rubber working devices. Likewise they may be used for treating rubber latex to produce similar effects in the raw rubber when coagulated.

Therefore, the present invention may be stated as comprising the treatment of vulcanized rubber for reclaiming purposes, or the treatment of raw rubber or other rubbers for purposes of plasticization, with residues, distillates and the like from cracked petroleum products such as described, or fractions thereof. The invention also covers such treatment especially where the agent is used at a sufficiently high temperature and in small quantities sufficient only to soften the mass, to render it plastic with proper mechanical working, and to obtain a desirable sheeting consistency without the dissolution of the rubber in the agent.

In general I prefer to use fractions having initial boiling points not lower than about 350° F. Such distillates of relatively low initial boiling points are obtainable by the fractionation of cycle stock, i. e. by fractionation of products which have passed through a cracking operation and are of higher boiling point than gasoline. These distillates are particularly suitable for reclaiming vulcanized rubber, but fractions of somewhat higher initial boiling point, such as the heavier fractions of the cycle stock or fractions from the cracked residuum above mentioned are preferable for softening or plasticization of raw rubber.

Cracked materials desirable for the uses above described may be obtained by subjecting a suitable stock to cracking operations at a moderately high temperature, for example to a temperature of about 900° F. While it is probably preferable to follow vapor phase cracking procedure, it is nevertheless feasible to crack in the liquid phase. The cracking operation may be high pressure cracking such as the "Cross process" or lower pressure cracking such as the "Dubbs process".

A desirable stock is the San Joaquin Valley crude above mentioned or a gas oil fraction obtained therefrom. However, other asphalt base oils may be used, or in fact any oil having appreciable aromatic content. Preferably the stock is recycled during cracking for the purpose of increasing the aromatic content as much as possible. Again, oils not of California type may be employed. If aromatics are not originally present they may be built up suitably by cracking at sufficiently high temperatures or by recycling for sufficiently prolonged periods during cracking.

Of the resulting products some of the overhead fractions such as the heavy gasoline ends constitute desirable rubber treating agents. Also the cracked cycle stock and various fractions thereof may be employed. Where a dark color is no objection the cracked residuum may be used as such, in which case it would be preferable to remove the solids before use. On the other hand when said dark color is objectionable it may be removed by filtration with a filter aid such as clay, or by precipitation of impurities such as asphalts and other heavy carbonaceous material with some agent such as propane or a light naphtha, or by chemical treatment as with salts or with a limited amount of sulfuric acid. Again the cracked residuum may be fractionated to obtain the fraction boiling for example between 550° F. and 750° F. The odor of this fraction may be improved if desired by a light acid treatment such as a treatment with 10 pounds of 93% sulfuric acid per barrel, followed by neutralization with caustic soda and by subsequent washing. Preferably however the acid treatment should be omitted, at least as far as the rubber treating properties of the product are concerned, for the reason that the acid treatment necessarily removes at least an appreciable proportion of the desired aromatic and other constituents. It is only when odor, color and the like are considerations that an acid treatment should be employed. For some purposes it may be desirable to employ a fairly viscous plasticizing agent, for example an agent corresponding in viscosity with a light lubricating oil which is often used for reclaiming rubber. Such an agent may be obtained readily by proper fractionation of the cracked residuum as above indicated or by the use of the heavier ends of the cycle stock above mentioned. Thus a suitable fraction may be obtained from the cracked residuum having a viscosity of 150 seconds Saybolt at 100° F. and a gravity of about 10° A. P. I. This low A. P. I. gravity indicates a pronounced aromatic character and corresponding softening, plasticizing and reclaiming action.

Of the overhead distillates, the lighter or so-called "pressure distillate" (i. e. the crude gasoline fractions produced by cracking as above) is commonly acid treated and redistilled in steam stills to produce cracked gasoline, and it is the heavier ends remaining in these stills which constitute the steam still bottoms above mentioned as also being a suitable agent. The specific gravity of these steam still bottoms varies considerably according to the various cracked stocks from which they are obtained, but in general the gravity will run in the neighborhood of 25° A. P. I. at 60° F. An Engler distillation test shows an initial point of around 400° F. and some 85% or 90% distills off at 500° F.

In addition to the bottoms and residues above described, it is also feasible to use residues obtained from the straight distillation of crudes, especially where the crude stock is reasonably high in aromatics and naphthenes, such as the San Joaquin Valley crude previously mentioned. As in the case of the cracked residuum, the straight run residuum may be distilled or fractionated or treated to remove asphalts, carbon and other impurities and to eliminate bad color and odor.

Considering the phase of reclamation of the rubber in more or less detail, one desirable procedure calls for the employment of a small quantity of one or more of the cracked agents above defined. I add such an agent to old vulcanized rubber goods and heat the mixture to a devulcanizing temperature (as described below) until the rubber mass has partially lost its coherence and so that it may be mechanically worked. In practice I usually employ about 8–10% of the agent calculated on the weight of the rubber to be devulcanized, but the amount of the agent may be varied anywhere between approximately 3% and 20% according to the stock to be treated or according to other incidental conditions. The rubber to be treated may be in chunks of convenient size or in small pieces or comminuted according as conditions require. Sometimes it is preferable to operate in an aqueous solution to insure good heat transfer and adequate digestion, and when cords or other cellulose fibers are present in the rubber the solution may contain caustic alkali to accomplish the destruction of the fiber so that the reclaimed rubber will contain only the pigments and the fillers which the original unvulcanized rubber contained.

The amount of aqueous solution is relatively unimportant, but it is always desirable to use it in a quantity sufficient to insure the good heat conductivity above mentioned. The strength of the solution may vary somewhat, but a solution containing about 8% of caustic soda has given excellent results. The entire charge is treated in a suitable autoclave at a temperature sufficiently elevated to promote softening or devulcanization of the scrap rubber, that is at a temperature above about 325° F. and preferably somewhere around 340° F. to 370° F., and the treatment is conducted for a period sufficiently long to accomplish the desired result. This treatment is usually carried on under a relatively high pressure, e. g. 100 pounds, but may also take place at atmospheric pressure. It is to be clearly understood that I do not limit myself either to the specific percentages of reclaiming agent and caustic soda to be used or to the specific temperature of treatment, since different conditions require variation. The devulcanization of old rubber, especially where no fabric is present as in inner tubes for automobile tires, may also be performed satisfactorily in an inert atmosphere such as steam, without any aqueous solution, the temperature of course being maintained sufficiently high (above about 325° F., e. g. 340° F. to 370° F.) for a sufficiently long period of time to accomplish the devulcanization and reclamation by the agent. Whether the rubber is to be treated in an aqueous solution or in steam, the treating apparatus preferably should include a masticating device or other suitable rubber working machine such as a blade mixer, for the purpose of facilitating the working of the rubber mass. When the rubber has attained a sufficiently plastic state it is removed from the apparatus and washed and dried. This reclaimed product sheets readily on a rubber mill, is highly plastic, and possesses the properties of the rubber from which the vulcanized goods were originally prepared. The reclaimed product may be revulcanized either alone or after blending with raw rubber. Rubber obtained by this process possesses a good odor, which is a feature of considerable importance.

As an example of another method of carrying on the reclaiming step, steam still bottoms from the redistillation of non-acid-treated pressure distillate obtained from the cracking of California crude oil, was employed. A quantity of vulcanized rubber scrap containing fiber was obtained by comminuting a quantity of old automobile tire casings on a rubber mill, said rubber scrap containing about 80% of rubber compound and 20% cotton fiber. This was introduced into an autoclave, and with each 400 parts by weight of scrap there were supplied 1500 parts of an 8% caustic soda solution and 40 parts of the steam still bottoms above described. The charge was heated to 370° F., and was held at this temperature for about twenty hours under a pressure of 100 pounds of steam. After treatment the rubber was removed from the autoclave, washed well and dried. It was then capable of being readily sheeted on a rubber mill, was highly plastic, and possessed all the properties of a good grade of reclaimed rubber.

Similar results were obtained by using the cracked cycle stock above described. As another example of reclaiming vulcanized rubber, I used the distillate from the cracked residue described. For every 200 parts of comminuted scrap rubber containing no fiber, I used about 15 parts of the reclaiming agent, but did not use any water or caustic solution. The mixture of rubber scrap and of the bottoms was heated in an autoclave for a period of one hour under a steam pressure of 100 pounds. After removal from the autoclave, and after washing and drying, the resultant product possessed substantially the same properties as that of the operation previously described.

The reclaimed product obtained from the use of my process is a solid of sufficiently soft and loose texture to permit it to be easily washed and dried. At the same time it is capable of being readily sheeted or moulded. It may be revulcanized to form new articles, or may be admixed with raw rubber prior to the vulcanization of the latter. In revulcanizing it is however necessary that the temperature be maintained below the incipient devulcanization temperature of about 325° F. if any appreciable quantity of the reclaiming agent remains in the rubber; otherwise the devulcanization point is again approached and vulcanization will not take place.

The cracked agents and fractions above described as constituting desirable devulcanizing and reclaiming agents, also constitute good plasticizing agents for raw rubbers as well as for vulcanized rubbers, and may be incorporated in small quantities into rubber being milled, that is into raw rubber being worked on the rolls of a rubber mill. The mechanical working of the agent into the rubber results in the attainment of a high state of plasticization. These agents may also be employed to plasticize mixtures of raw rubber and reclaimed rubber or other compound materials. In any of these cases the thorough incorporation of small quantities of cracked fractions into the rubber masses being milled, or being otherwise mechanically worked, soon accomplishes the desired plasticizing effects. For example commercially desirable amounts of agent to be incorporated into the rubber, normally will run from 4-10%, but workable limits will vary under varying conditions somewhere between 2 and 20% roughly speaking. The upper limit however is held within what is sufficient only to produce good plasticizing effects without tending toward solution or undue tackiness. It is preferable in using these agents to add first only a very small percentage, say ½% to the rubber mass on the rolls of the rubber mill, and then as milling proceeds to add additional quantities gradually until the desired amount has been introduced and thoroughly incorporated. Instead of using milling rolls, other mechanical rubber-working devices may be employed such as a blade-type of mixer or the like which is capable of working the rubber into a softened or plastic condition where it will sheet readily and lend itself to formation into desired goods. The plasticizing operation, as well understood in the art, is the working of the rubber in the presence of the selected plasticizing agent until the desired softened or plastic condition is obtained. When the plasticizing is accomplished on the rolls of a rubber mill, the action first is to knead the rubber into a shapeless mass, whereupon, especially as the cracked petroleum agents or other plasticizer is added, the rubber begins to soften up under the additional influence of the generated heat and of external heat if applied to the rolls. Gradually this working so plasticizes the rubber mass that a uniform sheet will be formed as the rubber is worked and forced between the rolls, this sheet being taken off when in the desired condition. Pigments and fillers may be added according to known practices.

Exactly the same procedure may be followed where a quantity of so-called "mineral rubber" is to be added, that is a natural asphalt such as gilsonite and elaterite or a petroleum asphalt obtained from residues of asphaltic petroleums.

In some instances it is possible to devulcanize and plasticize vulcanized rubbers with the agents herein described simply by working a comminuted rubber with the agent on a rubber mill at a sufficiently high temperature in much the same manner as in the plasticizing of raw rubber. With certain rubber stocks, such as old inner tubes, it is possible to place the rubber in a condition for re-use merely by heating the stocks in an oven with or without an atmosphere of steam, and then to mill the partially softened stock with the addition of the cracked fractions as softening and plasticizing agents. In this case, a high temperature on the mill is not required due to the prior softening of the stock.

Also the described agents obtained from the cracking of petroleum may be employed for the purpose of first treating rubber latex so as to produce a softening of the shells thereof and a swelling of the various particles without rupture or solution thereof. For this purpose the agent is to be used in small amounts and after treatment the latex is coagulated in any desirable manner to produce a coagulated raw rubber which may be readily worked into plastic condition and/or formed into rubber articles for subsequent vulcanization.

The agent used may be allowed to remain in the product, or it may be wholly or partially removed, as by heating under atmospheric pressure, prior to the vulcanization or revulcanization of the new product. Where not removed vulcanization or revulcanization must be held within limits around 325° F. to prevent devulcanization by the contained agent.

It is to be understood that wherever the terms "cracked residue", "steam still bottoms" and the like are used, they are intended to cover any fraction obtained therefrom and having the required properties. For example, in some instances it may be desirable to use an agent more or less volatile than the original, and such an agent may be readily obtained either by using a slightly different stock or by a redistillation. Also concentration of the effective constituents in the various agents may be accomplished by extraction with suitable solvents, such as liquid sulfur dioxide, aniline, furfural, nitro-benzene, iso-butyl alcohol and the like, the extract, after removal of the solvent, being used in such proportions as required for the various purposes.

The above disclosure is not to be taken as limiting, but is merely illustrative of the best modes of carrying out my invention, and many variations may be made within the scope of the following claims, as will be apparent to those skilled in the art.

I claim:
1. The method of reclaiming vulcanized rubber which includes the step of treating the rubber with a hydrocarbon oil obtained from the cracking of petroleum and having an initial boiling point of the order of 350° F. or higher, said hydrocarbon oil containing aromatic constituents and being chosen from the class consisting of high-boiling liquid still residuums remaining as residues in the distillation of the volatile fractions from said cracked petroleum, distillates resulting from the distillation of said still residuums, and still residues resulting from the re-distillation with steam of said volatile fractions.

2. The process as in claim 1 wherein the cracked petroleum is naphthenic base.

3. The process as in claim 1 wherein the cracked petroleum is asphaltic base.

MARCELLUS T. FLAXMAN.